United States Patent [19]
Miyazaki et al.

[11] Patent Number: 5,293,932
[45] Date of Patent: Mar. 15, 1994

[54] APPARATUS FOR CUTTING OFF PROJECTIONS INSIDE PIPES

[75] Inventors: Yasuo Miyazaki, Osaka; Akira Kamide, Higashiosaka; Shigeki Watari, Osaka, all of Japan

[73] Assignee: Osaka Bousui Construction Co., Ltd., Osaka, Japan

[21] Appl. No.: 957,386

[22] Filed: Oct. 7, 1992

[30] Foreign Application Priority Data

Oct. 9, 1991 [JP] Japan ............................ 3-082129[U]

[51] Int. Cl.⁵ ............................................. E21B 29/00
[52] U.S. Cl. ............................................. 166/55.7
[58] Field of Search ............................ 166/55-55.8; 30/92, 92.5

[56] References Cited

U.S. PATENT DOCUMENTS

| | | | |
|---|---|---|---|
| 4,768,899 | 9/1988 | Dysarz | 166/55 X |
| 4,987,956 | 1/1991 | Hansen et al. | 166/55 X |
| 5,199,493 | 4/1993 | Sodder, Jr. | 166/55 X |

*Primary Examiner*—Thy M. Bui
*Attorney, Agent, or Firm*—Armstrong, Westerman, Hattori, McLeland & Naughton

[57] ABSTRACT

An apparatus easily movable inside pipes for cutting off projections in the interior of the pipe along the inner surface of the pipe. The apparatus includes a carrier movable inside the pipe. The carrier is provided with a shaft reciprocatingly movable axially of the pipe and rockingly rotatable circumferentially of the pipe, a rocking block movable with the shaft and a drive device for the shaft. The rocking block has a cutter blade reciprocatingly movable axially and radially of the pipe as projected forward from the block axially of the pipe, and drive devices for the blade.

2 Claims, 10 Drawing Sheets

APPARATUS FOR CUTTING OFF PROJECTIONS INSIDE PIPES

TECHNICAL FIELD

The present invention relates to an apparatus for cutting off projections in the interior of pipes under remote control.

BACKGROUND ART

The present applicant has proposed a method of lining branches of underground pipes with a rigid plastics tube by inserting the tube into the branch through an opening thereof which is exposed from the ground and thereafter inflating the tube from inside with application of heat and pressure (see, for example, Unexamined Japanese Patent Publication HEI 1-171926). With this lining method, an excessive end portion of the tube projects from the branch into the pipe, so that the projecting end portion needs to be cut off and removed from inside the pipe after lining.

Figure 11:
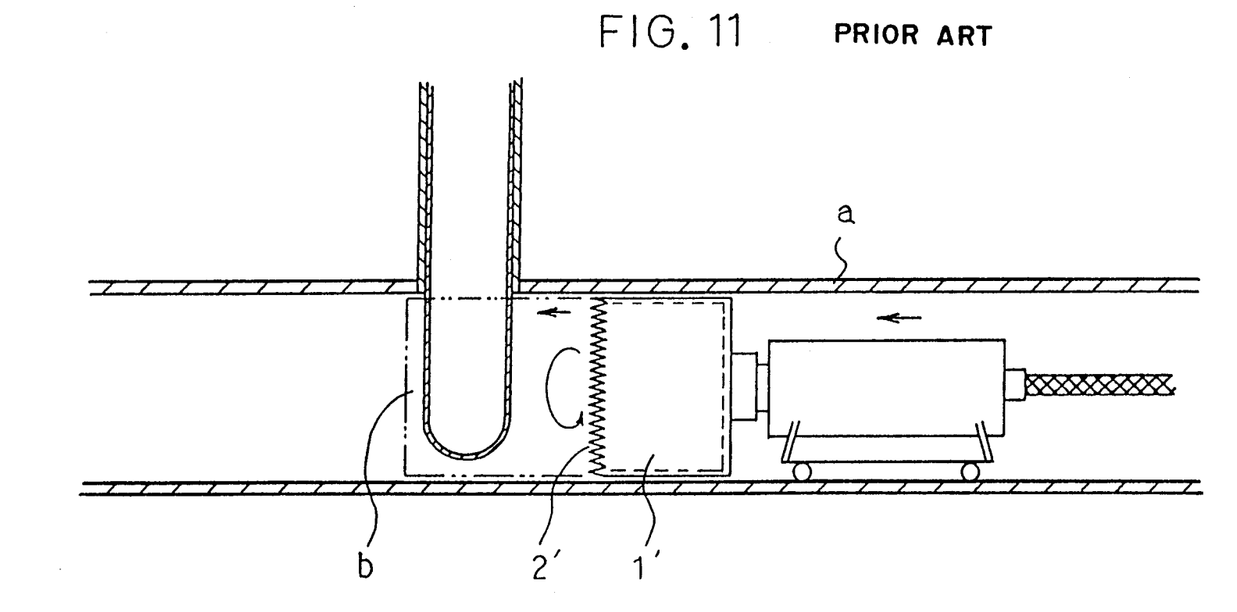
FIG. 11 is a diagram illustrating a conventional apparatus.

FIG. 11 schematically shows the construction of an apparatus already known for cutting off such projections inside pipes. This known cutting apparatus is adapted to cut off a projection b inside a pipe a with a saw-toothed blade 2' at the front end of a rotary drum 1' by pressing the blade against the projection in the direction of arrow. Accordingly, if the outside diameter of the drum 1' is closer to the inside diameter of the pipe a, the projection b can be cut off at a portion thereof closer to the inner surface of the pipe a. However, the pipe a generally has protrusions (now shown) such as protruding ends of other pipes attached thereto or stepped portions of joints. The drum must therefore be reduced in outside diameter so as to be movable through the pipe without striking against the protrusions. The projection then inevitably remains partly projecting inside the pipe.

DISCLOSURE OF THE INVENTION

The main object of the present invention is to provide an apparatus for cutting off projections in the interior of pipes which is readily movable through the pipe and capable of cutting off the internal projection at a portion thereof which is close to the inner surface of the pipe to the greatest possible extent.

Other features of the present invention will become apparent from the following description.

The present invention provides an apparatus for cutting off projections in the interior of pipes which is characterized in that the apparatus comprises:

a carrier movable through the pipe axially thereof under remote control, a brake pad reciprocatingly movable as supported on the carrier radially of the pipe by the operation of a first drive device, a movable base reciprocatingly movable as supported on the carrier axially of the pipe by the operation of a second drive device, a rotary shaft rockingly rotatable about the axis of the pipe as supported on the movable base by the operation of a third drive device, a rocking block rockingly rotatable with the rotary shaft, a cutter blade projecting forward from a front end of the rooking block in parallel to the axis of the pipe and movable relative to the rocking block axially and radially of the pipe, a fourth drive device for reciprocatingly moving the cutter blade radially of the pipe, and a fifth drive device for repeatedly reciprocatingly moving the cutter blade axially of the pipe over a suitable stroke length.

BEST MODE OF CARRYING OUT THE INVENTION

An embodiment of the present invention will be described below with reference to the accompanying drawings.

As will be apparent from FIGS. 1 to 4 showing an apparatus of the invention as installed in a pipe a, the apparatus has a carrier 1 which is movable through the pipe a axially thereof under remote control. Suitable as means for moving the carrier 1 under remote control is, for example, a rope 22 (see FIG. 9) serving as pulling means.

Mounted on the carrier 1 is a brake pad 3 which is reciprocatingly movable radially of the pipe by the operation of a first drive device 2. The first drive device 2 comprises a pair of right and left cylinders 2a (see FIG. 4) fixed to a frame 1a of the carrier 1. The brake pad 3 is attached to the outer ends of piston rods 2b of the cylinders 2a.

Figure 3:
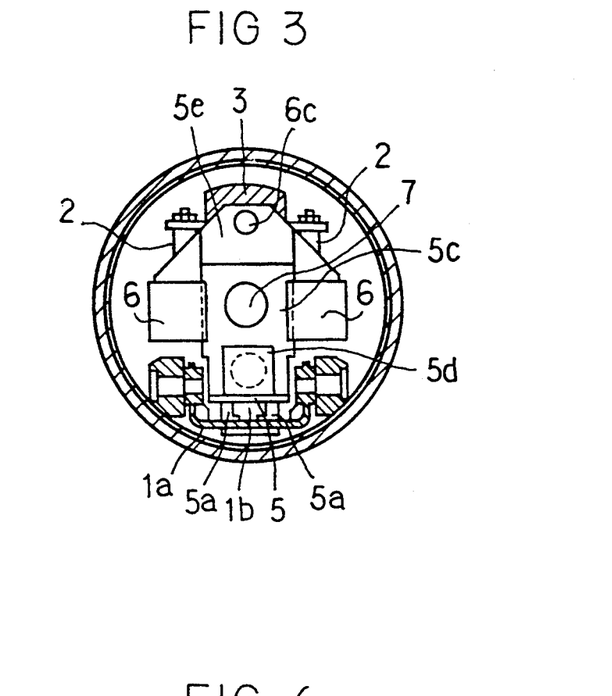
FIG. 3 is a right side elevation of the same.
Figure 4:
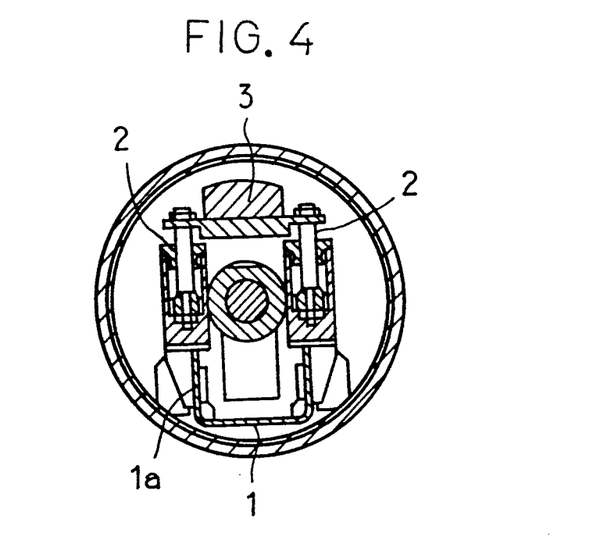
FIG. 4 is a view in section taken along the line 4—4 in FIG. 2.

Further mounted on the carrier 1 is a movable base 5 which is reciprocatingly movable axially of the pipe by the operation of a second drive device 4. As shown in FIG. 3, the carrier 1 has a guide rail 1b extending axially of the pipe on an intermediate portion of the frame 1a. The movable base 5 is reciprocatingly movable along the rail 1b by being guided by guides 5a attached to the base 5. The second drive device 4 comprises a cylinder 4a fixedly mounted on the carrier 1 and having a piston rod 4b, the outer end of which is connected to the rear side of a front bearing block 5b provided on the movable base 5. A rear bearing block 5c is formed in its lower portion with a through bore 5d for the rear portion of the cylinder 4a to move therethrough when the movable base 5 moves in reciprocation.

A rotary shaft 7 rockingly rotatable by the operation of a third drive device 6 (see FIG. 2) is supported by the front and rear bearing blocks 5b, 5c on the movable base 5. The center axis of the shaft 7 is approximately in coincidence with the center axis of the pipe a. The rotary shaft 7 has an externally threaded portion 7a. A threaded sleeve 8 having on its inner periphery a threaded portion 8a engageable with the threaded portion 7a is screwed on the shaft 7. The threaded sleeve 8 is reciprocatingly moved along the shaft 7 by the operation of the third drive device 6, whereby the shaft 7 can be rotated rockingly. The third drive device 6 comprises a pair of right and left cylinders 6a (see FIG. 2) fixed to the movable base 5. The cylinders 6a each have a piston rod 6b, the outer end of which is fixedly connected to the threaded sleeve 8 by a support member 6d.

A guide rod 6c extending rearward axially of the pipe is attached to a portion of the support member 6d which portion is intermediate widthwise of the apparatus. The rod 6c is supported by an auxiliary bearing block 5e fixedly mounted on the rear bearing block 5c.

A rocking block 9 rockingly rotatable with the rotary shaft 7 is attached to the front end of the shaft 7. Mounted on the rocking block 9 are a cutter blade 10 projecting forward from the front end of the rocking block 9 and movable axially and radially of the pipe, a fourth drive device 11 for moving the cutter blade 10 radially of the pipe, and a fifth drive device 12 for moving the blade axially of the pipe.

Figure 2:
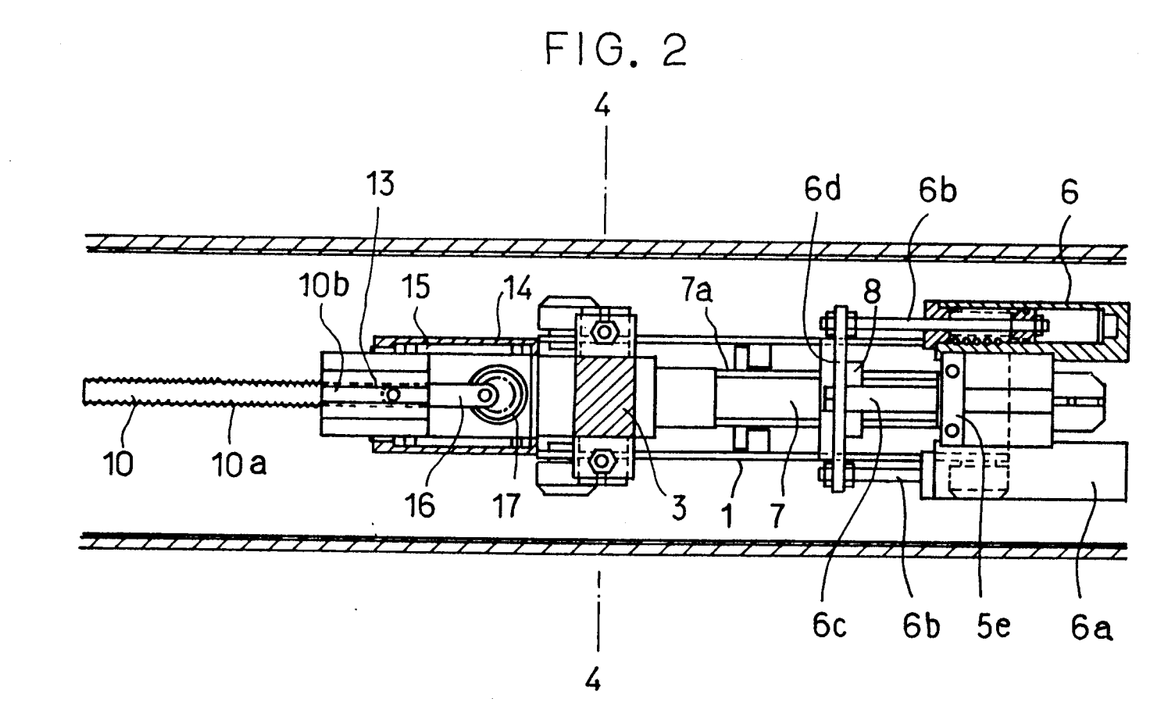
FIG. 2 is a plan view of the same.
Figure 6:
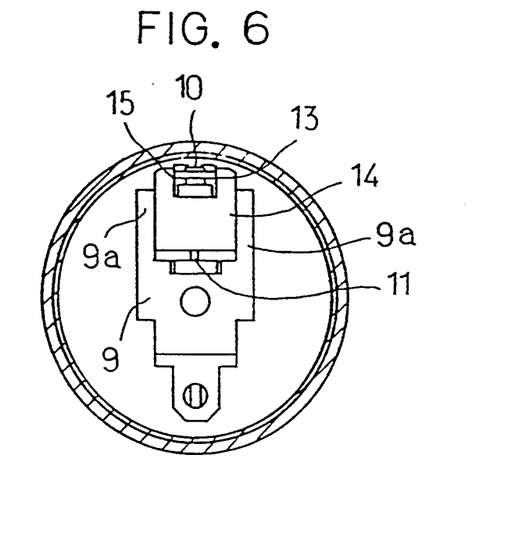
FIG. 6 is a front view of FIG. 5 showing the same with the projection omitted.

The cutter blade 10 extending axially of the pipe is adapted to cut off projections inside the pipe by sawing with side edges 10a (see FIG. 2). The cutter blade 10 is fixed at its base end 10b to a blade support member 13, which is fitted in a guide groove 15 (see FIG. 6) in a blade support 14 movably axially of the pipe. The blade support member 13 is further connected by a link 16 to an eccentric portion of a rotary disk 17. The disk 17 has a tubular lower portion 17a connected by bearings 18 to the blade support 14. As seen in FIG. 6, the blade support 14 is held between opposite side plates 9a, 9a of the rocking block 9 against lateral movement. When the blade support 14 is reciprocatingly moved radially of the pipe by the operation of the fourth drive device 11 mounted on the rocking block 9, the bearings 18, tubular portion 17a, rotary disk 17, link 16, blade support member 13 and cutter blade 10 are reciprocatingly moved radially of the pipe with the reciprocating movement of the blade support 14.

The tubular portion 17a of the rotary disk 17 is mounted on a rotary shaft 12a of the fifth drive device 12 (such as a hydraulic motor) mounted on the rocking block 9, and is rotatable with the shaft 12a but movable axially thereof. Accordingly, the tubular portion 17a is movable with the blade support 14 axially of the shaft 12a although rotatable with the shaft 12a.

Figure 8:
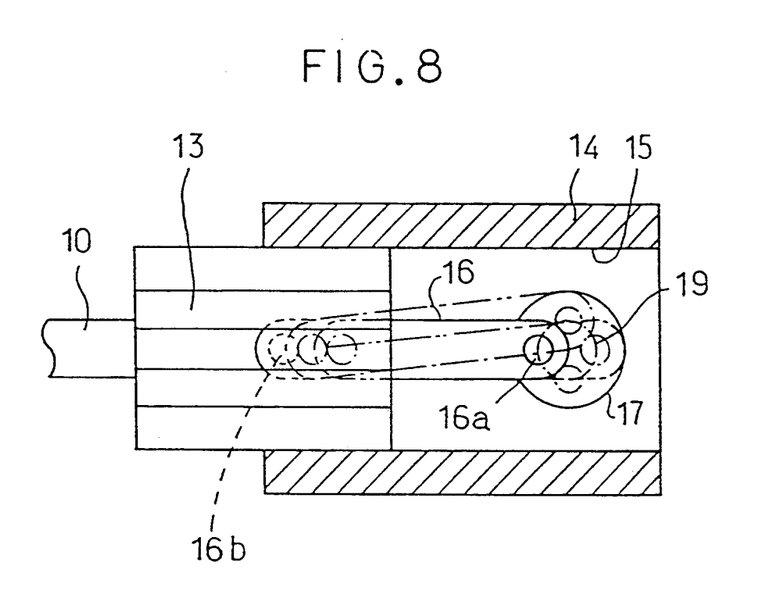
FIG. 8 is a diagram illustrating a link in operation.

The rotary disk 17 is rotated by the operation of the fifth drive device 12. The base end of the link 16 pinned as at 16a to the above-mentioned eccentric portion of the disk 17 then moves along a path in the form of a circle 19 as shown in FIG. 8. This movement linearly reciprocatingly moves along the guide groove 15 the blade support member 13 connected to the front end of the link 16 by a pin 16b, consequently moving the cutter blade 10 similarly over a stroke length corresponding to the diameter of the circle 19 to enable the side edge 10a of the cutting blade 10 to cut projections. A contact member 20 for recognizing the position of projections inside the pipe is provided at the front end of the rocking block 9 so as to be positioned at the center of the pipe. Preferably, at least the front end portion of the contact member 20 is made of rubber or like cushioning material.

Figure 7:
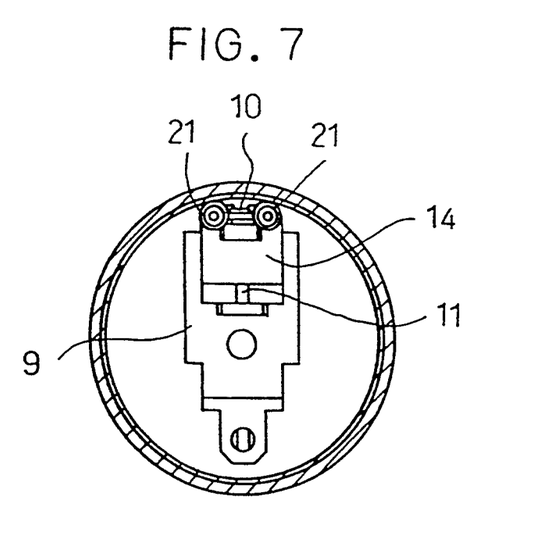
FIG. 7 is a view corresponding to FIG. 6 and showing guide rolls mounted on a blade support.

With reference to FIG. 7, the blade support 14 can be provided at opposite ends of its front side with a pair of opposite guide rolls 21, 21 which is to contact the inner surface of the pipe when the support 14 moves forward. The guide rolls 21, 21 roll on the inner surface of the pipe a during the rocking rotation of the rocking block 9 to reduce the frictional resistance due to contact with the pipe inner surface, also serving as members for positioning the support 14 in place radially of the pipe.

Figure 9:
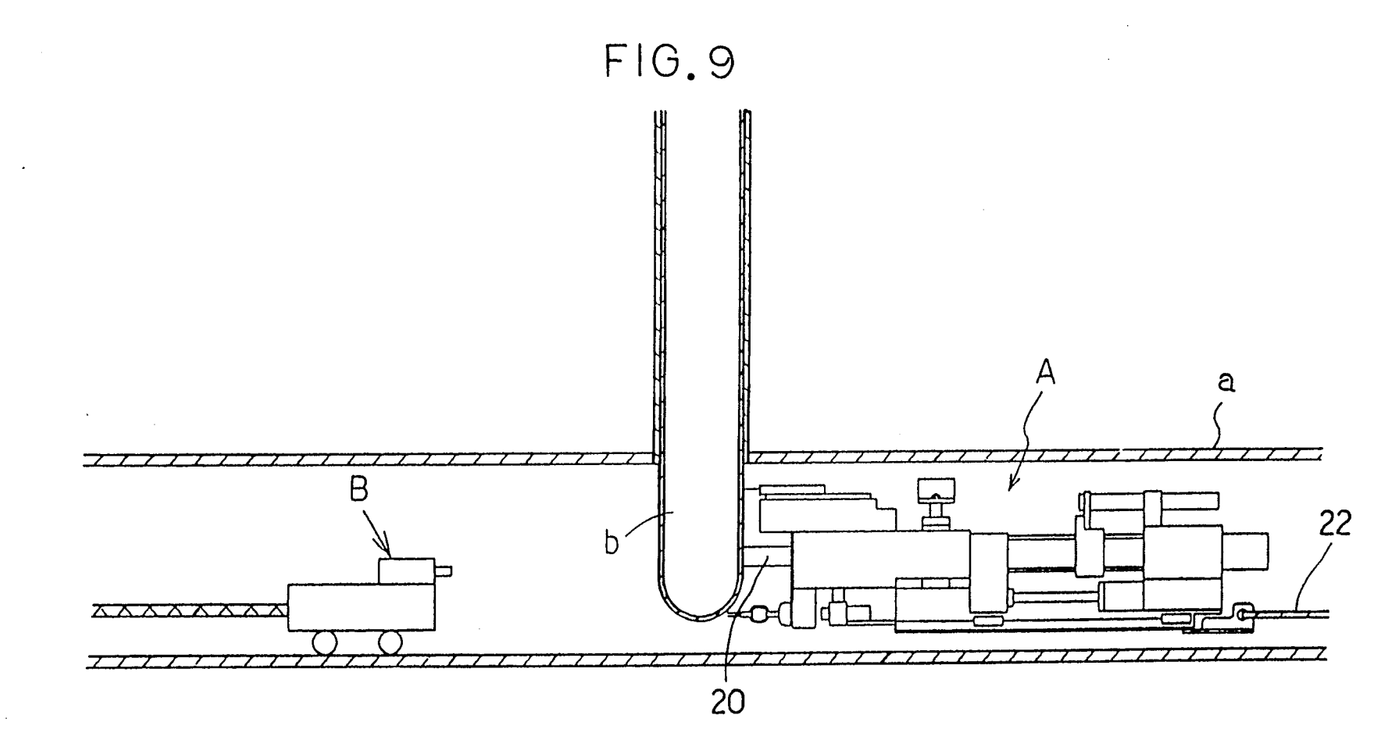
FIG. 9 is a diagram illustrating the apparatus of the invention as positioned close to the projection and a television camera dolly.

FIG. 9 shows the apparatus A of the invention and a television camera dolly B as moved inside the pipe a to a position close to the internal projection b to be cut off.

Figure 1:
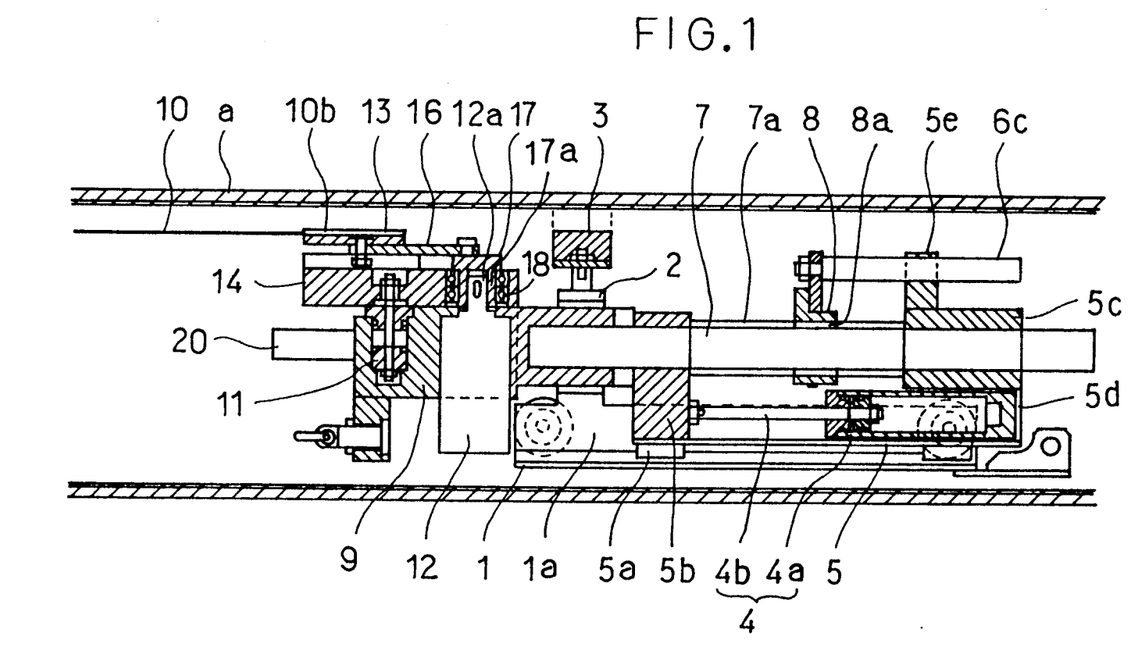
FIG. 1 is a view in longitudinal section showing an apparatus embodying the invention and installed inside a pipe.
Figure 10:
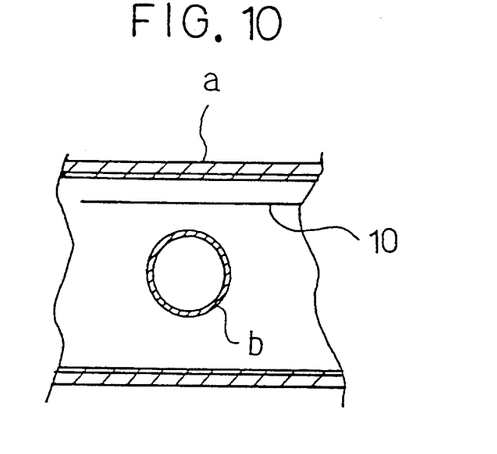
FIG. 10 is a diagram for schematically illustrating the position of the cutter blade relative to the projection during travel inside the pipe.

The apparatus of the invention is moved through the pipe in the state shown in FIG. 1 in which the cutter blade 10 and the brake pad 3 are held in their backwardly moved position away from the pipe inner surface, and the movable base 5 is held in its advanced position. The cutter blade 10 is held away from the pipe inner surface during this movement through the pipe, so that even if there is inside the pipe a protrusion as of a pipe attached thereto, the apparatus is smoothly movable inside the pipe a without being blocked by the protrusion. To avoid the collision of the cutter blade 10 with the internal projection b while the apparatus is moving inside the pipe, the blade is held as rotated sidewise from the top position shown in FIG. 9 through about 90 degrees (see FIG. 10). The cutter blade 10 can be so adjusted in position easily by rockingly rotating the rocking block 9 through a suitable angle.

The apparatus A of the invention is moved inside the pipe while being monitored by the television camera dolly B inside the pipe as seen in FIG. 9, and the carrier is immediately brought to a halt upon the contact member 20 striking against the internal projection b. The striking contact of the contact member 20 with the projection b positions the cutter blade 10 in place relative to the projection b with respect to the axial direction of the pipe.

Figure 5:
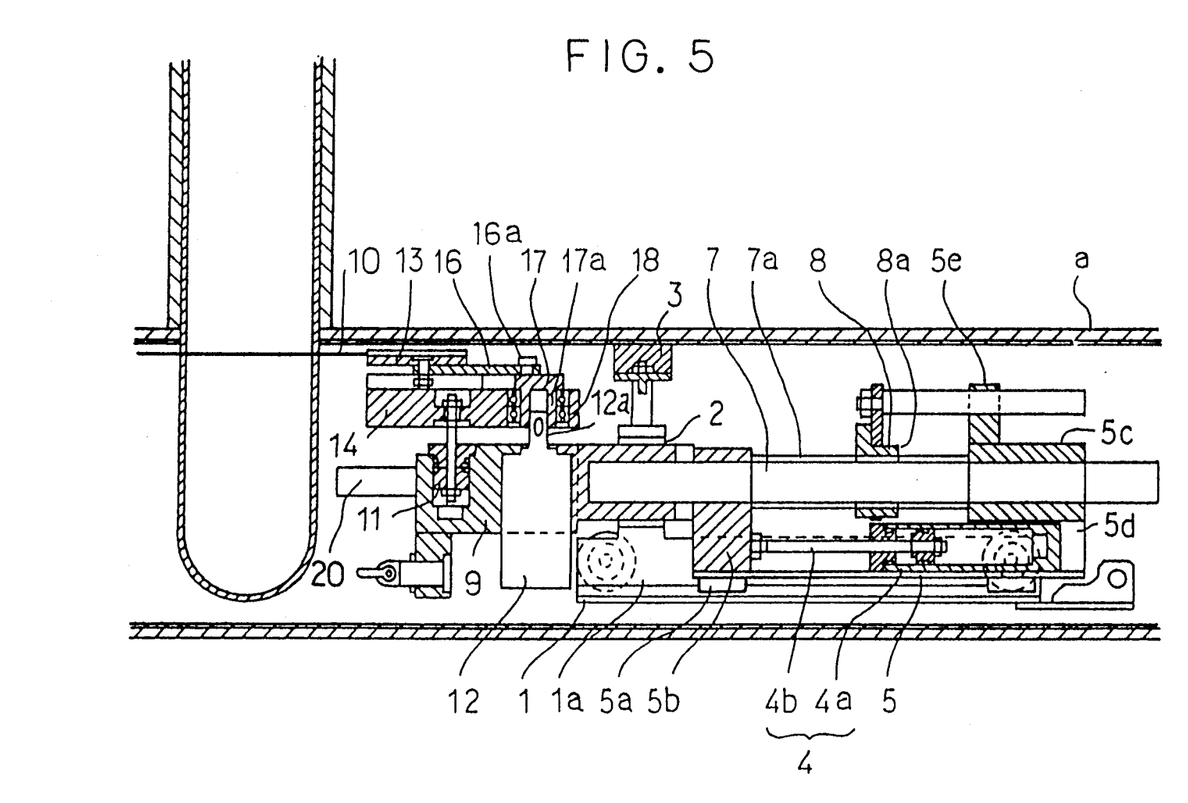
FIG. 5 is a view corresponding to FIG. 1 and showing the apparatus of the invention as set in position for a projection inside the pipe.

After the apparatus A of the invention is halted at the position where the member 20 is in contact with the projection b, the first drive device 2 is operated to forwardly move the brake pad 3 radially of the pipe into pressing contact with the pipe inner surface (see FIG. 5). The pressing contact of the brake pad 3 with the pipe inner surface holds the carrier 1 to the inner surface of the pipe a. Next, the second drive device 4 is operated to slightly retract the movable base 5 from the advanced position shown in FIG. 1, whereby the contact member 20 attached to the front end of the base 5 is released from the internal projection b and made free (see FIG. 5). The rocking block 9 is now ready to rock freely.

In this state, the fourth drive device 11 is operated to forwardly move the cutter blade 10 radially of the pipe to a position as close to the pipe inner surface as possible, and the fifth drive device 12 is thereafter operated to repeatedly reciprocatingly move the cutter blade 10 axially of the pipe over a small stroke length. With the cutter blade 10 in this sawing operation, the third drive device 6 is operated to cause the rotary shaft 7 and the rocking block 9 to revolve the blade 10 about the center axis of the shaft 7, whereby the projection b can be cut off at a portion thereof close to the pipe inner surface. FIG. 5 shows the apparatus in this cutting operation.

After the cutting operation, the apparatus is returned to the state of FIG. 1 again and thereby made ready for the subsequent operation.

With the apparatus of the present invention, the cutter blade extending axially of the pipe can be selectively brought to one of two positions, i.e., a position where the blade is away from the pipe inner surface toward the center of the pipe, and a position where the blade is as close to the pipe inner surface as possible. Accordingly, the apparatus is smoothly movable inside the pipe with the cutter blade positioned away from the pipe inner surface. With the cutter blade alternatively positioned as close to the pipe inner surface as possible when cutting the projection inside the pipe, the projection can be cut off along the inner surface at the position close to the inner surface to the greatest possible extent without impairing the movability of the apparatus inside the pipe.

We claim:

1. An apparatus for cutting off projections in the interior of pipes characterized in that the apparatus comprises:
   a carrier movable through the pipe axially thereof under remote control,
   a brake pad reciprocatingly movable as supported on the carrier radially of the pipe by the operation of a first drive device,
   a movable base reciprocatingly movable as supported on the carrier axially of the pipe by the operation of a second drive device,
   a rotary shaft rockingly rotatable about the axis of the pipe as supported on the movable base by the operation of a third drive device,
   a rocking block rockingly rotatable with the rotary shaft,
   a cutter blade projecting forward from a front end of the rocking block in parallel to the axis of the pipe and movable relative to the rocking block axially and radially of the pipe,
   a fourth drive device for reciprocatingly moving the cutter blade radially of the pipe, and
   a fifth drive device for repeatedly reciprocatingly moving the cutter blade axially of the pipe over a suitable stroke length.

2. An apparatus as defined in claim 1 wherein the rocking block is provided with a contact member for recognizing the position of the projection inside the pipe.

* * * * *